(12) United States Patent
Gehman et al.

(10) Patent No.: US 6,745,273 B1
(45) Date of Patent: Jun. 1, 2004

(54) AUTOMATIC DEADLOCK PREVENTION VIA ARBITRATION SWITCHING

(75) Inventors: Judy M. Gehman, Fort Collins, CO (US); Jeffrey J. Holm, Eden Prairie, MN (US); Richard D. Wiita, Wyoming, MN (US); Karla K. Waasdorp, Eden Prairie, MN (US)

(73) Assignee: LSI Logic Corporation, Milpitas, CA (US)

(*) Notice: Subject to any disclaimer, the term of this patent is extended or adjusted under 35 U.S.C. 154(b) by 371 days.

(21) Appl. No.: 09/759,921

(22) Filed: Jan. 12, 2001

(51) Int. Cl.⁷ .............................................. G06F 13/36
(52) U.S. Cl. ........................ 710/113; 710/114; 710/116
(58) Field of Search .................................. 710/100, 305, 710/113, 114, 116

(56) References Cited

U.S. PATENT DOCUMENTS

| | | | |
|---|---|---|---|
| 5,068,781 A | * | 11/1991 | Gillett et al. ............... 710/108 |
| 5,191,649 A | * | 3/1993 | Cadambi et al. ............ 709/225 |
| 5,274,780 A | * | 12/1993 | Nakao ......................... 710/107 |
| 5,376,588 A | | 12/1994 | Pendse |
| 5,428,753 A | * | 6/1995 | Kondo et al. ................ 710/107 |
| 5,696,027 A | | 12/1997 | Crane, Jr. et al. |
| 5,952,726 A | | 9/1999 | Liang |
| 6,048,753 A | | 4/2000 | Farnworth et al. |
| 6,064,113 A | | 5/2000 | Kirkman |
| 6,111,756 A | | 8/2000 | Moresco |
| 6,198,635 B1 | | 3/2001 | Shenoy et al. |

OTHER PUBLICATIONS

AMBA™ Specification (Rev. 2.0), 1999, 1–1 through 6–38.

\* cited by examiner

*Primary Examiner*—Tim Vo
(74) *Attorney, Agent, or Firm*—Christopher P. Maiorana, PC

(57) ABSTRACT

A method for controlling arbitration that may be used for a bus. The method generally comprises the steps of (A) controlling a bus mastership for the bus using a first arbitration scheme, (B) controlling the bus mastership using a second arbitration scheme in response to a first signal indicating a delay in a transfer between a first master of a plurality of masters and a slave on the bus, and (C) controlling the bus mastership using the first arbitration scheme in response to a second signal ending the delay in the transfer between the first master and the slave.

20 Claims, 3 Drawing Sheets

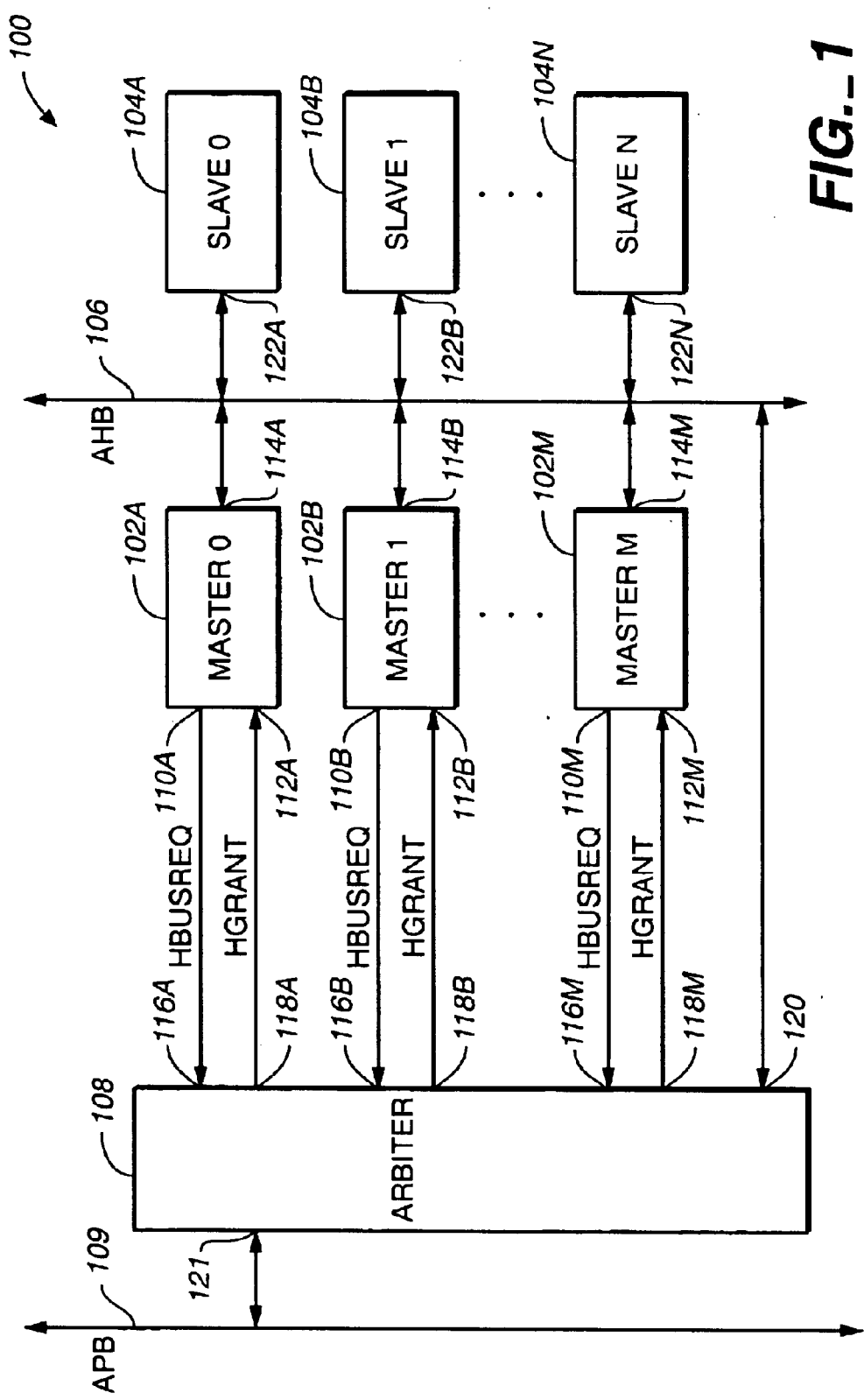
FIG._1

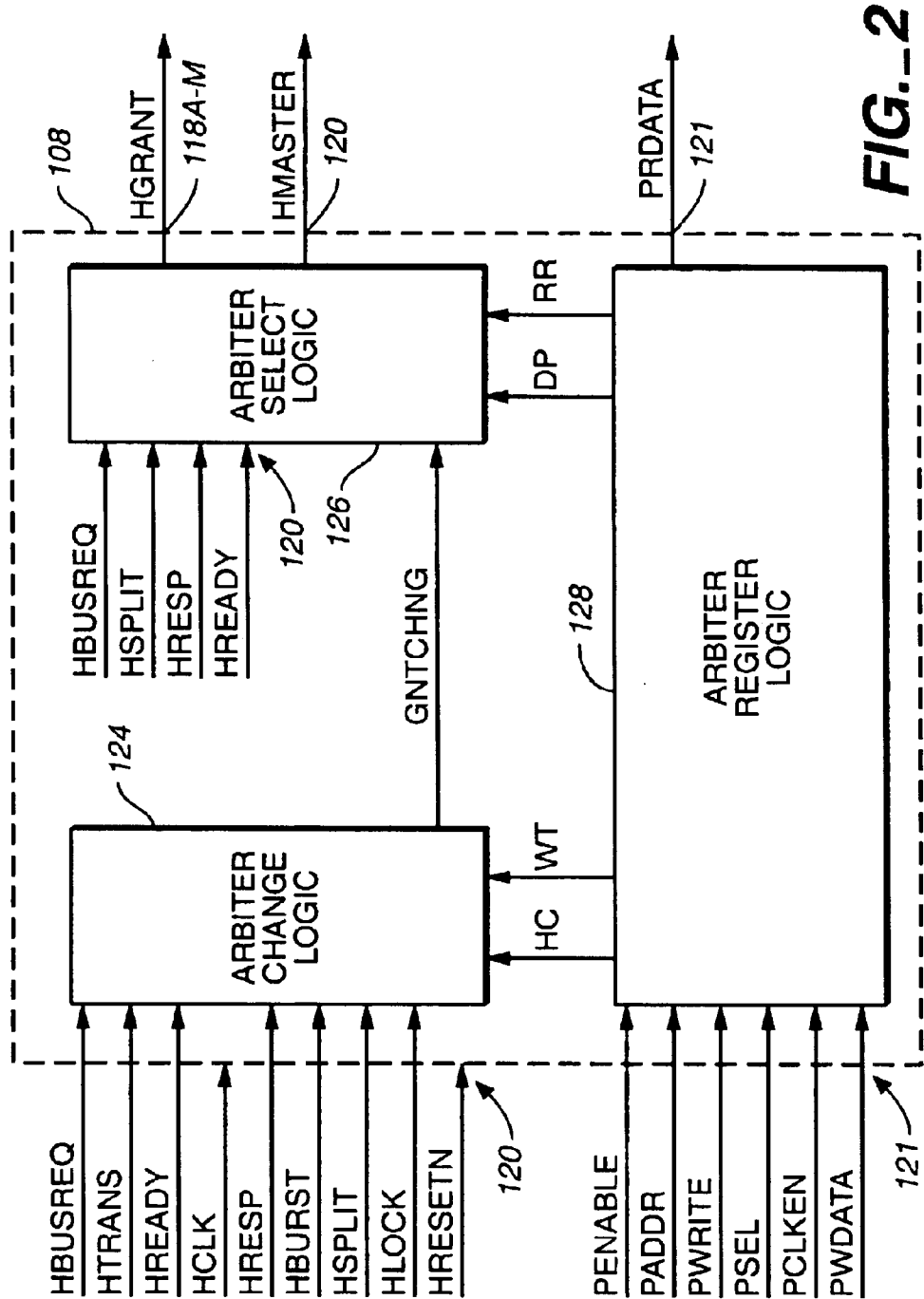
FIG._2

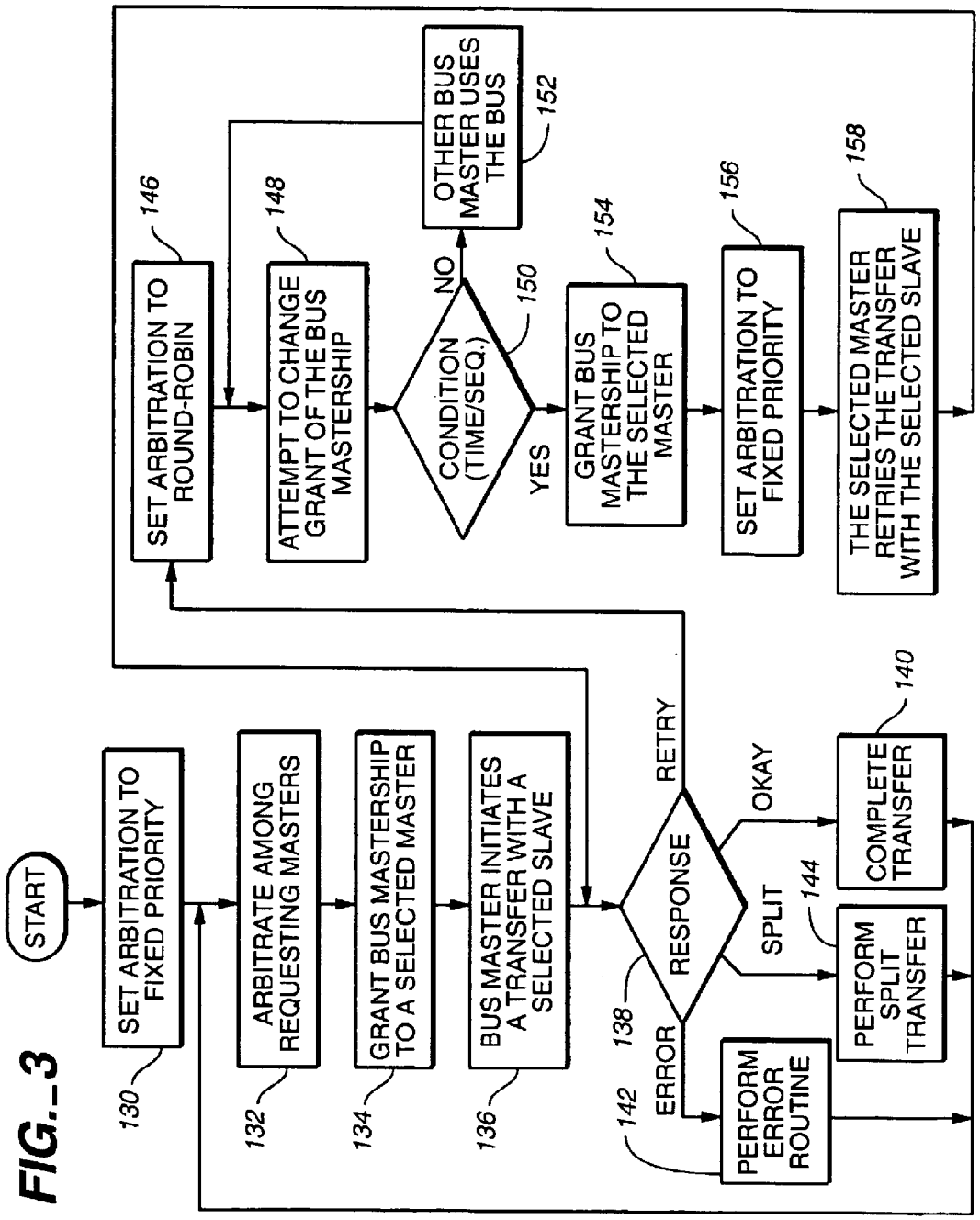
FIG._3

US 6,745,273 B1

AUTOMATIC DEADLOCK PREVENTION VIA ARBITRATION SWITCHING

FIELD OF THE INVENTION

The present invention relates to a method and/or architecture for bus arbitration generally and, more particularly, to a method for avoiding a bus deadlock through arbitration switching.

BACKGROUND OF THE INVENTION

An Advanced Microcontroller Bus Architecture (AMBA) specification defines on-chip communications standards for microcontrollers. The AMBA specification is being used worldwide by a variety of application specific integrated circuit vendors. The AMBA is being used in wireless, telecommunications, networking, office automation, and storage applications. The AMBA specification defines three busses, an Advanced High-Performance Bus (AHB), an Advanced System Bus (ASB), and an Advanced Peripheral Bus (APB).

The AHB portion of the AMBA specification provides communications between multiple masters and multiple slaves via the AHB. A bus mastership for the AHB is controlled by an arbiter using a fixed priority arbitration scheme. When a given master has the bus mastership, then the given master may initiate one or more transfers with one or more slaves. Any slave that cannot respond immediately to a transfer may issue a RETRY or a SPLIT response. The RETRY and the SPLIT responses allow the bus to be used for other purposes while the slave prepares the transfer.

The AHB specification states that the slave issuing the RETRY response (a "retry slave") should only be involved in transfers to one master at a time. The AHB specification, however, has no provisions to enforce the one-master-at-a-time limitation. Consequently, a deadlock situation on the AHB may be created when two masters initiate overlapping transfers to one retry slave.

Consider a situation where a first master initiates a first transfer with the retry slave. While the retry slave is preparing to complete the first transfer, a second master of higher priority may obtain the bus mastership. If the second master initiates a second transfer with the retry slave, then the retry slave will present a RETRY response to the second master. The retry slave will then ignore or delay the second transfer until the first transfer is completed. However, the second master will prevent the first master from obtaining the bus mastership until the second transfer is completed. The result is a deadlock on the bus.

SUMMARY OF THE INVENTION

The present invention concerns a method for controlling arbitration that may be used for a bus. The method generally comprises the steps of (A) controlling a bus mastership for the bus using a first arbitration scheme, (B) controlling the bus mastership using a second arbitration scheme in response to a first signal indicating a delay in a transfer between a first master of a plurality of masters and a slave on the bus, and (C) controlling the bus mastership using the first arbitration scheme in response to a second signal ending the delay in the transfer between the first master and the slave.

The objects, features and advantages of the present invention include providing a method and/or architecture that may (i) prevent retry capable slaves from deadlocking a bus in a multiple-master system, (ii) avoid added complexity to the retry capable slaves, and/or (iii) provide a fixed priority arbitration scheme for the bus under most practical conditions.

BRIEF DESCRIPTION OF THE DRAWINGS

These and other objects, features and advantages of the present invention will be apparent from the following detailed description and the appended claims and drawings in which:

FIG. 1 is a block diagram of a bus system in accordance with a preferred embodiment of the present invention;

FIG. 2 is a block diagram of an arbiter; and

FIG. 3 is a flow diagram of a method for operating the bus system.

DETAILED DESCRIPTION OF THE PREFERRED EMBODIMENTS

Referring to FIG. 1, a block diagram of a multiple-master, multiple-slave bus system 100 using an Advanced High-Performance Bus (AHB) is shown. The AHB is defined in an Advanced Microcontroller Bus Architecture (AMBA) specification (AMBA Specification Rev. 2.0, ARM Limited, Cambridge, England). The AMBA specification is herein incorporated by reference in its entirety. The present invention may be practiced with other bus specifications to meet the design criteria of a particular application.

The bus system 100 generally comprises two or more masters 102A–M, one or more slaves 104A–N, the AHB 106, and an arbiter 108. An Advanced Peripheral Bus (APB) 109 of the AMBA specification may be optionally included in the bus system 100. Each master 102A–M may have an output 110A–M respectively that may present a signal (e.g., HBUSREQ) to the arbiter 108. The signal HBUSREQ may be implemented as a bus request signal. Each master 102A–M may have an input 112A–M respectively that may receive a signal (e.g., HGRANT) from the arbiter 108. The signal HGRANT may be implemented as a bus grant signal. Each master 102A–M may have an interface 114A–M respectively that may provide for presenting signals to and receiving signals from the AHB 106.

The arbiter 108 may have inputs 116A–M that may receive the signals HBUSREQ from the masters 102A–M respectively. The arbiter 108 may have outputs 118A–M that may present the signals HGRANT to the masters 102A–M respectively. The arbiter 108 may have an interface 120 that may provide for presenting signals to and receiving signals from the AHB 106. The arbiter 108 may optionally have an interface 121 that may provide for presenting signals to and receiving signals from the APB 109. Each slave 104A–N may have an interface 122A–N respectively that may provide for presenting signals to and receiving signals from the AHB 106.

Referring to FIG. 2, a block diagram of the arbiter 108 is shown. The arbiter 108 generally comprises an arbiter change logic 124 and an arbiter select logic 126. An optional arbiter register logic 128 may be included in the arbiter 108. The arbiter register logic 128 generally allows behavior of the arbiter 108 to be controlled by software via the APB 109.

The signals HBUSREQ from the masters 102A–M may be received by the arbiter change logic 124 and the arbiter select logic 126. The signals HGRANT may be presented by the arbiter select logic 126 to the masters 102A–M. The arbiter select logic 126 may present a signal (e.g., HMASTER) to the AHB 106. The signal HMASTER may be implemented as a master indication signal that identifies the current master 102A–M having the bus mastership. The arbiter change logic 124 may present a signal (e.g., GNTCHNG) to the arbiter select logic 126. The signal GNTCHNG generally indicates when the grant of the bus mastership should be changed. The signal GNTCHNG may be implemented as a grant change signal.

The arbiter change logic 124 may receive multiple signals from the AHB 106. The multiple signals received by the, arbiter change logic 124 include, but are not limited to the signals HBUSREQ, a transfer type signal (e.g., HTRANS), a ready signal (e.g., HREADY), a clock signal (e.g., HCLK), a response signal (e.g., HRESP), a burst indication signal (e.g., HBURST), one or more split bus signals (e.g., HSPLIT), a lock signal (e.g., HLOCK) and reset signals (e.g., HRESETn). The arbiter select logic 126 may also receive multiple signals from the AHB 106. The multiple signals received by the arbiter select logic 126 include, but are not limited to the signals HBUSREQ, the signal HCLK, the signals HRESETn, the signal HSPLIT, the signal HRESP and the signal HREADY.

The arbiter change logic 124 may receive a signal (e.g., HC) and another signal (e.g., WT). The signal HC may be implemented as an HREADY Count signal. The signal HC generally identifies a number of asserted HREADY cycles the arbiter change logic 124 should wait before changing the grant when a burst type in the signal HBURST is incrementing. The signal WT may be implemented as a watchdog timer. The signal WT generally identifies a number of clock cycles the arbiter change logic 124 may wait before changing the grant.

The arbiter select logic 126 may receive a signal (e.g., DP) and another signal (e.g., RR). The signal DP may be implemented as a Deadlock Protection signal. The signal DP may be asserted to instruct the arbiter select logic 126 to switch from a fixed priority arbitration scheme to a round-robin arbitration scheme when encountering the RETRY value for the signal HRESP. The signal DP may be deasserted to instruct the arbiter select logic 126 not to switch arbitration schemes when encountering the RETRY value for the signal HRESP. The signal RR may be implemented as a round-robin arbitration signal. The signal RR may be asserted to instruct the arbiter select logic 126 always to use the round-robin arbitration scheme. The signal RR may be deasserted to instruct the arbiter select logic 126 primarily to use the fixed priority arbitration scheme.

The signal HC, the signal WT, the signal DP, and the signal RR may be hardwired or under software control, depending upon design criteria of the particular implementation. The arbiter register logic 128 may be used to provide software control of the signal HC, the signal WT, the signal DP, and the signal RR. The software may communicate with the arbiter register logic 128 via the APB 109.

The arbiter register logic 128 may receive multiple signals from the APB 109. The multiple signals may include, but are not limited to a select signal (e.g., PSEL), an enable signal (e.g., PENABLE), a bus address signal (e.g., PADDR), a read/write access signal (e.g., PWRITE), a clock enable signal (e.g., PCLKEN), and a write data signal (e.g., PWDATA). The arbiter register logic 128 may receive some signals from the AHB 106. The signals include, but are not limited to the signal HCLK and the signals HRESETn. The arbiter register logic 128 may present a read data signal (e.g., PRDATA) to the APB 109. Using the above-mentioned signals, the software may read values from and write values to the arbiter register logic 128 for the signal HC, the signal WT, the signal DP, and the signal RR.

Referring to FIG. 3, a flow diagram of a method for operating the bus system 100 is shown. Initially, the arbiter 108 may set an arbitration scheme to a fixed priority arbitration scheme (e.g., block 130). The arbiter 108 may then arbitrate among the masters 102A–M requesting the bus mastership (e.g., block 132). The fixed priority arbitration scheme generally assigns a priority value to each master 102A–M. The arbiter 108 may grant the bus mastership to a selected master 102X having the highest priority value among the masters 102A–M requesting bus control (e.g., block 134). The selected master 102X may initiate a first transfer with a selected slave 104X once the selected master 102X has obtained control of the AHB 106 (e.g., block 136).

The selected slave 104X may respond to the first transfer in any one of several ways. If the selected slave 104X may be capable of completing the first transfer immediately, then the selected slave 104X may present the signal HRESP with a value (e.g., OKAY) to the selected master 102X (e.g., the OKAY branch of decision block 138). The signal HRESP with the value OKAY may generally be referred to as a signal OKAY. The selected slave 104X may then complete the first transfer (e.g., block 140).

The selected slave 104X may determine that an error has occurred in association with the first transfer. Here, the selected slave 104X may present the signal HRESP with another value (e.g., ERROR) to the selected master 102X (e.g., the ERROR branch of decision block 138). The signal HRESP with the value ERROR may generally be referred to as a signal ERROR. The selected master 102X may respond to the signal ERROR by performing an appropriate error handling routine (e.g., block 142).

In situations where the selected slave 104X may be unable to complete the first transfer immediately, then the selected slave 104X may present the signal HRESP with one of two values (e.g., RETRY or SPLIT) to the selected master 102X (e.g., the RETRY and SPLIT branches of decision block 138 respectively). The signal HRESP with the value RETRY may generally be referred to as a signal RETRY. The signal HRESP with the value SPLIT may generally be referred to as a signal SPLIT. If the selected slave 104X is capable of preforming split transfers among multiple masters 102A–M, then the selected slave 104X may present the signal SPLIT to the selected master 102X (e.g., the SPLIT branch of decision block 138). The selected master 102X and the selected slave 104X may then perform the first transaction as a split transfer (e.g., block 144).

The selected slave 104X may be capable of responding to only one selected master 102X at a time. The selected slave 104X may present the signal RETRY to the selected master 102X (e.g., the RETRY branch of decision block 138). The signal RETRY generally indicates that the selected slave 104X may not be ready to complete the first transfer and that the selected slave 104X may not be capable of performing split transfers.

Upon detection of the signal RETRY, the arbiter select logic 126 may change the arbitration scheme from the fixed priority scheme to a round-robin scheme (e.g., block 146). The round-robin arbitration scheme generally grants the bus mastership to each master 102A–M requesting the bus mastership in a sequence. In a preferred embodiment, the sequence may be a predefined order. In alternative embodiments, the sequence may by based upon, but is not limited to time, history, a predetermined pattern, and the like.

The arbiter 108 generally attempts to change the grant of the bus mastership after changing the arbitration scheme (e.g., block 148). The bus mastership may be granted to another master 102Y or remain with the selected master 102X. The arbiter 108 may then check a condition to avoid a deadlock of the AHB 106 (e.g., decision block 150). If the condition is not meet (e.g., the NO branch of decision block 150), then AHB 106 may be used by the other master 102Y (e.g., block 152). After the other master 102Y relinquishes the bus mastership, the arbiter 108 attempts again to grant the bus mastership to a different master 102A–M (e.g., block 148).

When the condition is met (e.g., the YES branch of decision block 150), then the bus mastership may be granted to the selected master 102X (e.g., block 154). The arbiter 108 may then change the arbitration scheme from the round-robin scheme to the fixed priority scheme (e.g., block 156). The selected master 102X may retry the first transaction with the selected slave 104X (e.g., block 158). The operation may then proceed based upon the response signal presented by the selected slave 104X (e.g., decision block 138).

For the round-robin arbitration scheme, the condition may be one loop around to all of the masters 102A–M requesting the bus mastership. The one loop generally ends (the condition is met) with the bus mastership returning to the selected master 102X. In an alternative embodiment, the condition may be based upon other parameters. For example, the condition may be satisfied after a predetermined period has elapsed since the selected master 102X last relinquished the bus mastership. In another example, the condition may be satisfied after a predetermined sequence of other masters 102A–M have been granted the bus mastership. Various other parameters may be used to meet the design criteria of a particular application. The condition is generally required to insure that the bus mastership may be eventually returned to the selected master 102X. Returning the bus mastership to the selected master 102X generally allows the first transfer to be completed and thus may avoid deadlock of the AHB 106.

At some point, the selected slave 104X generally presents a response signal other than the signal RETRY for the first transfer (e.g., the ERROR, SPLIT or OKAY branches of decision block 138). After the appropriate action has been taken (e.g., block 142, 144, or 140) for the non-retry response, the arbiter 108 may again attempt to change the grant for bus mastership (e.g., block 132). The process may then be repeated. Note that while the method shown in FIG. 3 provides an example of one transfer requiring a retry, the method may also be applied in situations where multiple overlapping transfers from one or more masters 102A–M require retries to one or more slaves 104A–N.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s). While the invention has been particularly shown and described with reference to the preferred embodiments thereof, it will be understood by those skilled in the art that various changes in form and details may be made without departing from the spirit and scope of the invention.

What is claimed is:

1. A method for operating a bus comprising the steps of:
   (A) controlling a bus mastership for said bus using a first arbitration scheme;
   (B) controlling said bus mastership using a second arbitration scheme in response to a first signal indicating a delay in a transfer between a first master of a plurality of masters and a slave on said bus; and
   (C) controlling said bus mastership using said first arbitration scheme in response to a second signal ending said delay in said transfer between said first master and said slave.

2. The method according to claim 1, further comprising the step of:
   controlling said bus mastership using said first arbitration scheme a predetermined period of time after said first master loses said bus mastership.

3. The method according to claim 1, further comprising the step of:
   controlling said bus mastership using said first arbitration scheme after granting said bus mastership in a predetermined sequence among said plurality of masters upon using said second arbitration scheme.

4. The method according to claim 1, wherein said first arbitration scheme is a fixed priority arbitration scheme.

5. The method according to claim 1, wherein said first signal is a retry signal indicating that said slave can only transfer to one of said masters at a time.

6. The method according to claim 1, further comprising the step of:
   controlling said bus mastership using said first arbitration scheme in response to completing one loop around using said second arbitration scheme, wherein said first arbitration scheme is a fixed priority scheme, said second arbitration scheme is a round-robin priority scheme, said first signal is a retry signal, and said second signal is selected from a group of signals consisting of an okay signal, an error signal, and a split signal.

7. The method according to claim 1, wherein step (C) comprises the sub-step of:
   controlling said bus mastership using said first arbitration scheme after granting said bus mastership back to said first master.

8. The method according to claim 4, wherein said second arbitration scheme is a round-robin arbitration scheme.

9. The method according to claim 5, wherein said second signal is selected from a group of signals consisting of an okay signal, an error signal, and a split signal.

10. The method according to claim 8, further comprising the step of:
    controlling said bus mastership using said fixed priority arbitration scheme in response to completing one loop around using said round-robin arbitration scheme.

11. A circuit comprising:
    a bus; and
    an arbiter configured to (i) control a bus mastership for said bus using a first arbitration scheme, (ii) control said bus mastership using a second arbitration scheme in response to a first signal indicating a delay in a transfer between a first master of a plurality of masters and a slave on said bus, and (iii) control said bus mastership using said first arbitration scheme in response to a second signal ending said delay in said transfer between said first master and said slave.

12. The circuit according to claim 11, wherein said arbiter is further configured to control said bus mastership using said first arbitration scheme a predetermined period of time after said first master loses said bus mastership.

13. The circuit according to claim 11, wherein said arbiter is further configured to control said bus mastership using said first arbitration scheme after granting said bus mastership in a predetermined sequence among said plurality of masters upon using said second arbitration scheme.

14. The circuit according to claim 11, wherein said first arbitration scheme is a fixed priority arbitration scheme.

15. The circuit according to claim 11, wherein said first signal is a retry signal indicating that said slave can only transfer to one of said masters at a time.

16. The circuit according to claim 11, wherein said arbiter comprises:
 a change logic configured to generate a signal requesting a change in said bus mastership; and
 a select logic configured to grant said bus mastership to one of said masters in response to said signal.

17. The circuit according to claim 14, wherein said second arbitration scheme is a round-robin arbitration scheme.

18. The method according to claim 15, wherein said second signal is a signal selected from a group consisting of an okay signal, an error signal, and a split signal.

19. The circuit according to claim 17, wherein said arbiter is further configured to control said bus mastership using said fixed priority arbitration scheme in response to completing one loop around using said round-robin arbitration scheme.

20. A circuit comprising:
 means for controlling a bus mastership for a bus using a first arbitration scheme;
 means for controlling said bus mastership using a second arbitration scheme in response to a first signal indicating a delay in a transfer between a first master of a plurality of masters and a slave on said bus; and
 means for controlling said bus mastership using said first arbitration scheme in response to a second signal ending said delay in said transfer between said first master and said slave.

* * * * *